Patented Aug. 13, 1929.

1,724,062

UNITED STATES PATENT OFFICE.

ARTHUR ZITSCHER AND WILHELM SEIDENFADEN, OF OFFENBACH-ON-THE-MAIN, GERMANY, ASSIGNORS TO GENERAL ANILINE WORKS, INC., OF NEW YORK, N. Y., A CORPORATION OF DELAWARE.

NEW NITROSAMINE-ALKALI-SALTS OF HALOGENATED AND METHYL-SUBSTITUTED AMINES.

No Drawing. Application filed December 16, 1927, Serial No. 240,633, and in Germany December 31, 1926.

In our copending application, Serial No. 240,632, filed on the same date an improved process for manufacturing alkali metal salts of nitrosamines of primary aromatic amines is described, which process comprises introducing the syndiazotate prepared at lower temperatures into a sufficiently concentrated caustic alkali solution and taking care, that the temperature of the reaction mixture permanently is not less than the temperature of conversion into the antidiazotate.

Our present invention relates to certain new nitrosamine alkali salts of halogenated and methylsubstituted anilines, unknown hitherto, which are obtainable by the aforesaid improved process with an excellent yield and in a very pure state, of which the following is an illustrative example in which the parts are by weight and all temperatures are in centrigrade degrees.

*Example.*

A syndiazotate solution prepared at lower temperatures from the diazocompound of 70, 75 parts of 5-chloro-2-toluidine and strong caustic potash solution is allowed to run while well stirring at a temperature of about 115° into a solution of 400 parts of caustic potash in 200 parts of water. In this manner with an excellent yield the potassium salt of the nitrosamine of 5-chloro-1.2-toluidine corresponding probably to the formula:

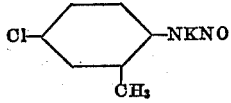

is obtained. It is a new compound unknown hitherto and represents light reddish small prisms.

In the same manner at a temperature of conversion of about 110° a flesh colored potassium salt of the nitrosamine of 4-chloro-1.2-toluidine is obtained, which crystallizes in small leaflets. The nitrosamines of 5.6-dichloro-1.2-toluidine and 2.6-dichloro-4-amino-1.3-xylene require a temperature of converision of about 120°. Their potassium salts represent light flesh-colored small needles and reddish small crystalline granules respectively, that of 4-bromo-2-toluidine-nitrosamine light lamellas, that of 5-chloro-2-bromo-1.4-toluidine almost colorless lamellas.

The alkali salts of the nitrosamine of 4-chloro-1.3-toluidine represent an orange colored crystal powder, of 4.5-dichloro-1.2-toluidine light fresh colored small crystals, of 2.5-dichloro-1.4-toluidine yellowish needles, of 2.3-dichloro-1.4-toluidine reddish needles, of 6-chloro-1.2-toluidine light flesh-colored small crystals. All these nitrosamines are new compounds.

We claim:

1. As new compounds the alkali salts of nitrosamines of halogenated and methylsubstituted anilines, being when dry yellowish to reddish to brownish crystalline substances and corresponding probably to the formula:

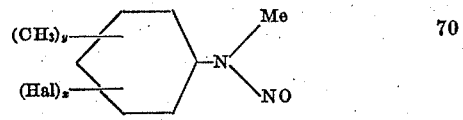

wherein $x$ is the number 1, 2 or 3 and $y$ the number 1 or 2 and wherein Hal represents a halogen and Me represents an alkali metal.

2. As new compounds the alkali salts of nitrosamines of halogenated ortho-toluidines, being when dry yellowish to reddish to brownish crystalline substances and corresponding probably to the formula:

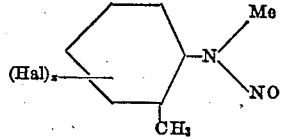

wherein $x$ is the number 1, 2 or 3 and wherein Hal represents a halogen and Me represents an alkali metal.

3. As new compounds the alkali salts of nitrosamines of chlorinated ortho-toluidines, being when dry yellowish to reddish to brownish crystalline substances and corresponding probably to the folmula:

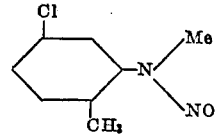

wherein the benzene nucleus may contain further chlorine atoms and Me represents an alkali metal.

In testimony whereof, we affix our signatures.

ARTHUR ZITSCHER.
WILHELM SEIDENFADEN.